United States Patent
Epstein et al.

(10) Patent No.: US 8,312,166 B2
(45) Date of Patent: Nov. 13, 2012

(54) PROXIMITY DETECTION METHOD

(75) Inventors: Michael Epstein, Spring Valley, NY (US); Raymond J. Krasinski, Suffern, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 372 days.

(21) Appl. No.: 12/089,950

(22) PCT Filed: Oct. 12, 2006

(86) PCT No.: PCT/IB2006/053746
§ 371 (c)(1),
(2), (4) Date: Apr. 11, 2008

(87) PCT Pub. No.: WO2007/043019
PCT Pub. Date: Apr. 19, 2007

(65) Prior Publication Data
US 2008/0256261 A1      Oct. 16, 2008

Related U.S. Application Data

(60) Provisional application No. 60/726,956, filed on Oct. 14, 2005.

(51) Int. Cl.
*G06F 15/173* (2006.01)
(52) U.S. Cl. ........ 709/238; 709/245; 709/249; 709/250; 709/251; 709/252; 709/253
(58) Field of Classification Search .................. 709/238, 709/245, 249, 250, 251, 252, 253
See application file for complete search history.

(56) References Cited

U.S. PATENT DOCUMENTS

| | | | |
|---|---|---|---|
| 5,812,524 A | 9/1998 | Moran et al. | |
| 6,832,253 B1* | 12/2004 | Auerbach | 709/226 |
| 2004/0238695 A1* | 12/2004 | Horst | 246/187 A |
| 2005/0188199 A1* | 8/2005 | Smith et al. | 713/165 |
| 2007/0030811 A1* | 2/2007 | Frei et al. | 370/238 |
| 2007/0078965 A1* | 4/2007 | Shimamura et al. | 709/224 |
| 2008/0174454 A1* | 7/2008 | Bitar et al. | 340/975 |

(Continued)

FOREIGN PATENT DOCUMENTS
EP      1475925 A1      11/2004
(Continued)

OTHER PUBLICATIONS

D. Brown: "A Weak Randomizer Attack on RSA-OAEP With e=3"; Certicom Research, Jul. 2005, pp. 1-7.

(Continued)

*Primary Examiner* — Lan-Dai T Truong

(57) ABSTRACT

A method of determining proximity between a root node and a leaf node in a network is presented. The method comprises computing a link proximity value between any two mutually connected nodes in the network. At an initial node, a proximity computation request message is sent containing a proximity counter to an intermediate node to which the initial node is connected. At an intermediate node, being connected to a first node and to a second node, upon receipt of the proximity computation request message containing a proximity counter from the first node, the computed link is added to a proximity value and passed on the proximity computation request message to the second node. At a final node, upon receipt of the proximity computation request message, the proximity between the root node and the leaf node is determined as the value indicated by the proximity counter.

9 Claims, 2 Drawing Sheets

U.S. PATENT DOCUMENTS

Figure 1:
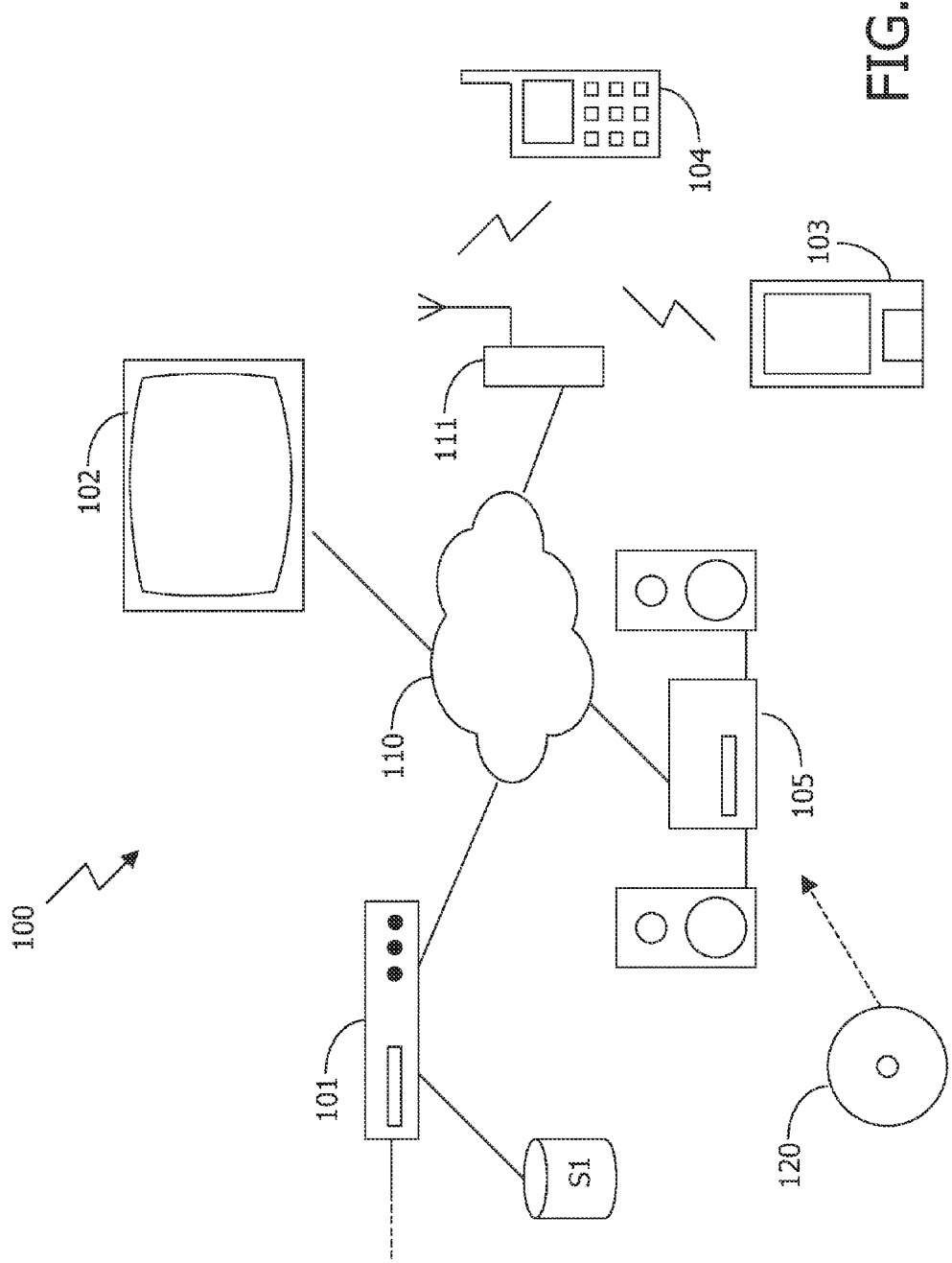

2009/0209228 A1 * 8/2009 Ford et al. .................. 455/404.2

FOREIGN PATENT DOCUMENTS

| GB | 2354386 A | 3/2001 |
| JP | 9214552 A | 8/1997 |
| WO | 0157665 A2 | 8/2001 |
| WO | 03079638 A1 | 9/2003 |
| WO | 2004014037 A1 | 2/2004 |
| WO | 2004030311 A1 | 4/2004 |
| WO | 2004030312 A1 | 4/2004 |

OTHER PUBLICATIONS

"RSA-OAEP Encryption Scheme"; D. Intellectual Property Statement, RSA Security, Inc., Sep. 2000, 1 page Document.

I. Damgard et al: "An Extended Quadratic Frobenius Primality Test With Average and Worst Case Error Estimates"; Basic Research in Computer Science (BRICS), Brics Report Series RS-03-09, Feb. 2003, 56 page Document.

R. Silverman: "Fast Generation of Random, Strong Rsa Primes"; The Technical Newsletter of RSA Laboratories-Spring 1997, pp. 9-13.

E. Fujisaki et al: "RSA-OAEP Is Secure Under the RSA Assumption"; Crypto 2001, LNCS 2139, pp. 260-274, 2001.

"Secure Hash Standard"; Federal Information Processing Standards Publication 180-2, Aug. 2002, 83 page Document.

Video Electronics Standards Association (VESA), May 9, 2005 Announcement of a New Digital Display Interface, 2 page Article, Downloaded From http://www.vesa.org.pressldisplayportpr.htm, on Mar. 20, 2012.

* cited by examiner

PROXIMITY DETECTION METHOD

CROSS-REFERENCE TO RELATED APPLICATIONS

This application claims priority to PCT Application No. PCT/IB2006/053746 filed on Oct. 12, 2006, which claims priority to U.S. Provisional Application No. 60/726,956 filed Oct. 14, 2005, which are incorporated in their entirety herein by reference.

In recent years, the number of content protection systems available has been growing rapidly. Some of these systems only protect the content against unauthorized copying, while others restrict the user's ability to access the content. These systems are often referred to as Digital Rights Management (DRM) systems.

Consumers want to enjoy content without hassle and with as few limitations as possible. They want to network their devices to enable all types of different applications and easily access any type of content. They also want to be able to share/transfer content in their home environment without limitations.

One way of protecting content in the form of digital data is to ensure that content will only be transferred from a transmitting device (source device, e.g. a digital video recorder, DVR) to a receiving device (sink device, e.g. a television display device) if the receiving device has been authenticated as being a compliant device and if the user of the content has the right to transfer (move, copy) that content to another device. If transfer of content is allowed, this will typically be performed in an encrypted way to make sure that the content cannot be captured in an unprotected, high-quality digital format.

Technology to perform device authentication and encrypted content transfer is available and is called a secure authenticated channel (SAC). In many cases, a SAC is set up using an Authentication and Key Exchange (AKE) protocol that is based on public key cryptography. Standards such as International Standard ISO/IEC 11770-3 and ISO/IEC 9796-2, and public key algorithms such as RSA and hash algorithms like SHA-1 are often used.

To set up a SAC, each device typically contains a unique encryption key that is used in a challenge/response protocol with another device to calculate a temporary, mutually shared key. The two devices subsequently use this shared key to protect the exchanged content and usage rights information.

A remaining issue is that a SAC may be set up between devices that are, physically or network-wise, far away from each other. To limit this possibility, various proposals have been made for some form of distance measurement that is to be performed when the SAC is set up. If the source and sink devices are too far away from each other, the SAC should not be set up or content exchange should be refused or limited.

Typically such distance measurement involves a challenge-response protocol where the time between sending the challenge and receiving the response is measured and used to estimate the distance between source and sink devices. Distance measurement can be combined with the authentication protocol of the SAC setup, as is taught for example in international patent application WO 2004/014037 (attorney docket PHNL020681).

Other methods of distance measurement are disclosed in international patent applications WO 2003/079638 (attorney docket PHUS020086), WO 2004/030311 (attorney docket PHUS010314) and WO 2004/030312 (attorney docket PHUS020358).

A sink device may operate as source device to yet further sink devices. These further sink devices may be reported to the source device, so that the source device knows it is not only connected to one sink device but actually to multiple sink devices.

All these connected source and sink devices can be visualized as a tree. There usually is one "root" node that makes the content available to many "intermediate" nodes. The intermediate nodes may be connected to other intermediate nodes and/or to "leaf nodes. The leaf nodes contain output means to render content. The intermediate nodes may also contain such output means, or may serve solely to pass content from one node to another.

In general it is not easy for the root node to determine in a secure manner whether all leaf and intermediate nodes are within the required proximity to the root node. The root node only has secure access to any node directly connected to it. Information about more remote nodes can be obtained by having the remote nodes report this information to the root node. However these messages must pass through one or more intermediate nodes. This introduces the risk that an attacker blocks or throws away such messages, or alters them so that the proximity of one or more of these remote nodes cannot be determined.

It is an object of the present invention to improve upon the above. This object is achieved according to the invention in a method as claimed in claim 1. The proximity between a leaf node and the root node is determined by adding up the link proximity values of all the links in the path between that leaf node and the root node. This sum represents the round-trip time between that leaf node and the root node. If this sum exceeds a predetermined maximum value, the leaf node and the root node are too far away from each other. Preferably the initial node is the leaf node, and the final node is the root node.

If the root node initiates the method, then an attacker may block the proximity computation request messages and the leaf nodes will never be able to determine whether they are within the required proximity. By having the leaf nodes initiate the method, it becomes possible to require that the leaf nodes refuse to process content if no response or acknowledgement was received within a certain time. An attacker is thus required to let the requests pass.

The space allocated in the request for storing the proximity value may be limited in size. Advantageously then an overflow flag can be provided in the request. If the addition of a link proximity value to the stored proximity value results in a value that cannot be stored in said space, the overflow flag is set to 'on'. This allows the final node to determine that the computed total proximity value exceeds the maximum that can be stored in the request. With an appropriate choice of the space to be allocated, it follows that the computed total proximity value must exceed the maximum allowed proximity.

Advantageous embodiments are set out in the dependent claims.

Figure 2:
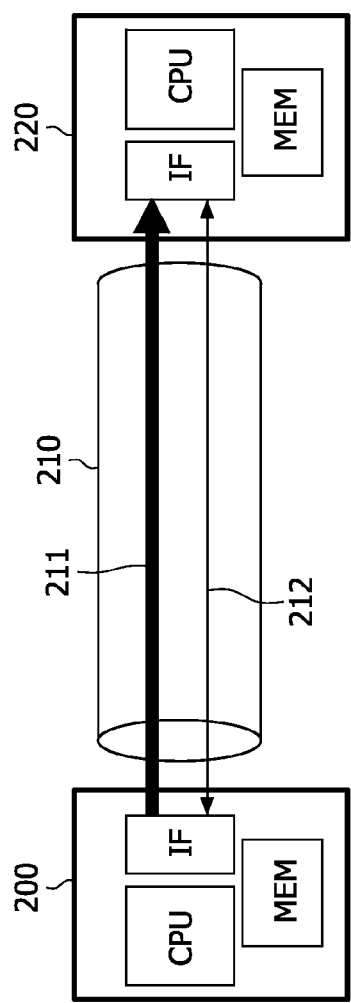

The invention will now be discussed in more detail with reference to the figures, in which:

FIG. 1 schematically shows a system comprising devices interconnected via a network;

FIG. 2 schematically illustrates a source device and a sink device; and

Figure 3:
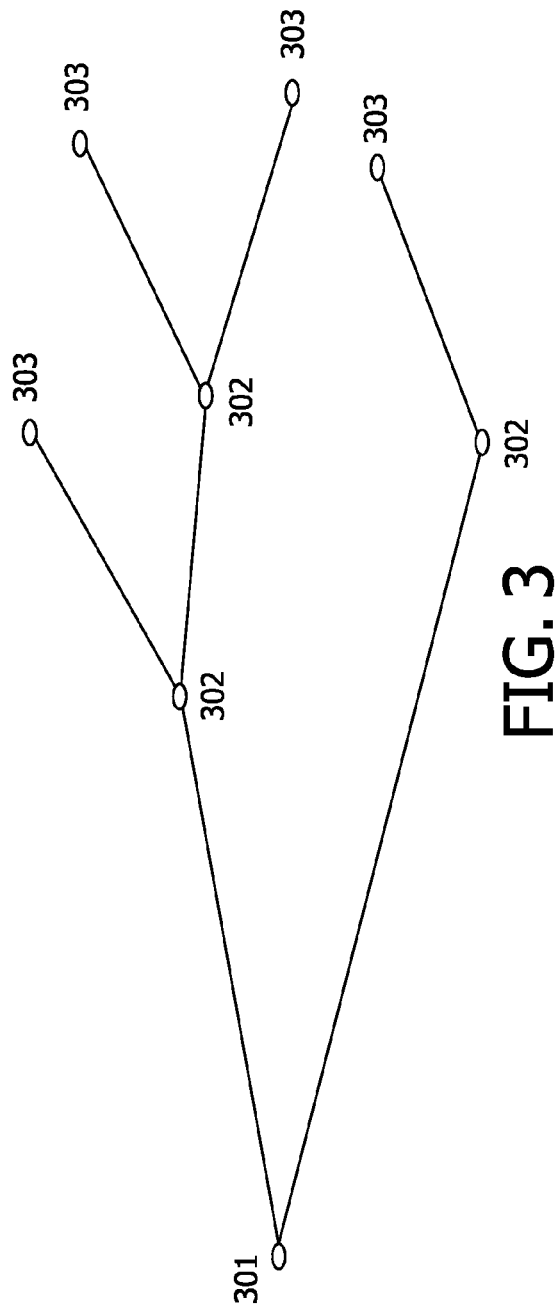

FIG. 3 schematically illustrates a tree of interconnected devices.

Throughout the figures, same reference numerals indicate similar or corresponding features. Some of the features indicated in the drawings are typically implemented in software, and as such represent software entities, such as software modules or objects.

FIG. 1 schematically shows a system 100 comprising devices 101-105 interconnected via a network 110. A typical digital home network includes a number of devices, e.g. a radio receiver, a tuner/decoder, a CD player, a pair of speakers, a television, a VCR, a digital recorder, a mobile phone, a tape deck, a personal computer, a personal digital assistant, a portable display unit, a car entertainment system, and so on. These devices are usually interconnected to allow one device, e.g. the television, to control another, e.g. the VCR. One device, such as e.g. the tuner/decoder or a set top box (STB), is usually the central device, providing central control over the others.

Content, which typically comprises things like music, songs, movies, animations, speeches, videoclips for music, TV programs, pictures, games, ringtones, spoken books and the like, but which also may include interactive services, is received through a residential gateway or set top box 101. Content could also enter the home via other sources, such as storage media like discs or using portable devices. The source could be a connection to a broadband cable network, an Internet connection, a satellite downlink and so on. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium SI such as a suitably large hard disk, allowing the recording and later playback of received content. The storage medium SI could be a Personal Digital Recorder (PDR) of some kind, for example a DVD+ RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a base station 111, for example using Bluetooth or IEEE 802.11b. The other devices are connected using a conventional wired connection. To allow the devices 101-105 to interact, several interoperability standards are available, which allow different devices to exchange messages and information and to control each other. One wellknown standard is the Universal Plug and Play (http://www.upnp.org) standard.

It is important to ensure that the devices 101-105 in the home network do not allow the creation of unauthorized copies of the content via interception of the content when traveling over the network. Hence the devices 101-105 are provided with a data protection system for a digital display interface. This data protection system ensures that only authorized and protected content transfers can occur from a first device, hereafter referred to as source device or just source, to a second device, hereafter referred to as sink device or just sink.

FIG. 2 schematically illustrates a source device 200 and sink device 220. Both devices comprise a digital interface IF, a processor CPU and a storage component MEM. Typically the source device 200 is a device that holds content which is to be streamed (or otherwise transmitted) to the sink device 220. The sink device 220 then typically is a device that receives this streamed content and renders it, e.g. on a display screen.

Any of the devices 101-105 mentioned above may operate as the source device 200 and/or as the sink device 220. It is worth noting that a device may operate as source device relative to one other device, and as sink device relative to a further device. This may even occur simultaneously.

An example of a source device 200 and a sink device 220 is a digital video recorder (DVR) connected to a television display. The digital audiovisual content recorded by the DVR is streamed to the display so the user can watch the content. The source may also be a (laptop or desktop) computer, where the sink is its display screen.

As shown in FIG. 2, the interface between source device 200 and sink device 220 comprises a high-speed unidirectional main link 211 and a relatively low-speed bidirectional auxiliary channel 212. In an embodiment envisaged by the inventors, the main link 211 can carry up to 10 Gigabits per second and the auxiliary channel 212 has a 1 Megabit per second transfer rate. The main link 211 is used to carry compressed or uncompressed digital data such as video and/or audio data.

Technology to perform device authentication and encrypted content transfer is available and is called a secure authenticated channel (SAC). A SAC 210 is assumed to have been set up as shown in FIG. 2 to protect the data transferred over the main link 211 and auxiliary link 212. Alternatively only the main link 211 or only the auxiliary link 212 may be protected by the SAC 210. For example, if the content to be transferred is already encrypted, there is no need to transfer the content over a SAC, as that would mean needless double encryption operations. Yet alternatively the SAC may for some message transfers be bypassed, for example for already-encrypted messages or for messages that can safely be sent without protection.

SACs and the underlying technologies are well known. Public key cryptography and digital certificates may be used for mutual authentication between the source and sink devices. The data is transferred over the main link in encrypted form.

It is assumed is that the source and sink devices have already established the secure authenticated channel 210. Many ways are possible to establish a SAC. Which particular technique is chosen is out of scope for the present invention. It is also assumed that both devices share a common secret authentication key (denoted by K) and another common secret (referred as seed and denoted by R). Those values are preferably computed or exchanged during the SAC establishment phase.

As discussed above, the structure of the interconnected devices 101-105 may be regarded as a tree. This structure is schematically illustrated in FIG. 3. There is one root node 301 that makes the content available to intermediate nodes 302. The intermediate nodes 302 are in turn connected to other intermediate nodes 302 and to leaf nodes 303.

The root node 301 initiates the proximity detection protocol, collects the messages from the intermediate and leaf nodes 302, 303 and determines if there are devices (nodes) that are too far away. If not, the root node does not distribute content along to any of the other nodes until the device(s) that is/are too far away have been removed from the network.

For instance, a requirement could be that a message can travel from the root node to a leaf node and back within 7 milliseconds. This is sufficiently short to know with reasonable certainty that a leaf node must be close to the root node.

The choice depends on many parameters, such as the expected travel time of data over the network.

The requirement may be complemented with a requirement concerning each individual link between a source device and a sink device. For instance, one may require that the round-trip time of a message between a source device and a sink device is less than 500 microseconds, in addition to the above requirement that the round-trip time between root node and leaf node is less than 7 milliseconds.

There are one or more devices that only serve as sink devices. These are the leaf nodes 303. A device that is a leaf node has output means to render content, e.g. a display screen and/or loudspeakers. A DVD recorder or other content export device may or may not be regarded as a sink device.

Further there are zero or more devices that both operate as sink devices and as source devices. These are the intermediate nodes 302. These devices may comprise output means although this is not necessary. The intermediate nodes may also serve solely to pass content from one node to another.

For example, a portable hard disk recorder can serve as sink device to receive content from a digital television receiver. The recorder by itself does not comprise a display. When it is connected to an external display (e.g. a TFT television screen), the display acts as the sink device-and as leaf node. The recorder now is both a sink and a source.

The connection between two nodes is referred to as a link. Any two nodes in the network engage in a distance measurement protocol to determine their own respective distances, usually by determining the time it takes to exchange messages. This time, the round-trip time, is directly related to the distance between them.

Typically such distance measurement involves a challenge-response protocol where the time between sending the challenge and receiving the response is measured and used to estimate the distance between source and sink devices. Distance measurement can be combined with the authentication protocol of the SAC setup, as is taught for example in international patent application WO 2004/014037 (attorney docket PHNL020681).

International patent application WO 2003/079638 (attorney docket PHUS020086) mentions that the time between query and reply comprises both the time for communicating the query and its reply and the time needed for computing the reply. The document further suggests subtracting the processing time from the measured time between sending the query and receiving the reply.

The determined distance between a particular source and sink is preferably stored by the source device, although it can also be stored by the sink device. This distance is hereafter referred to as the "link proximity value". The distance may be recomputed at regular intervals. The distance may be recomputed whenever a certain amount of data has been transferred from the source device to the sink device.

The proximity between a leaf node and the root node is determined by adding up the link proximity values of all the links in the path between that leaf node and the root node.

The determination preferably is initiated by a leaf node that sends out a proximity computation request to the root node. This request contains the link proximity value of the link connecting that leaf node to its source node. If this link proximity value is actually kept by this source node, then the leaf node includes the value zero (0) in the request.

Preferably proximity computation requests are encrypted or signed. If the requests are not encrypted or signed, the proximity values contained in the requests may be altered by an attacker. Further, preferably the requests contain a random "challenge" number (or nonce). Without such a nonce, an attacker can record an old request and resend it later, after having moved the device that sent it beyond the maximum allowed distance. By re-using the recorded request, the root node can be fooled into concluding that the device in question is still within the required proximity. This is known as a replay attack.

Every intermediate node that receives the proximity computation request first verifies the signature or decrypts the request, if necessary. Then the intermediate node adds the link proximity value to the value included in the request and then sends the augmented value towards the root along with the original nonce. When the request arrives at the root node, this value now represents the time needed to send a message from the root node to the leaf node that initiated the determination, and back.

One embodiment to transfer requests and responses between leaf nodes and the root node operates as follows. The leaf node 303 sends out the proximity computation request to the intermediate node 302 to which it is connected. The intermediate node 302 reads out the nonce and saves the nonce in a routing table associated with an identifier for the leaf node 303. The intermediate node 302 then passes on the proximity computation request message to the node to which this intermediate node 302 is connected.

Ultimately the request will arrive at the root node. If a response is sent back, this response will include the nonce that was present in the request. The intermediate node 302 looks up this nonce in its routing table and forwards the response to the node identified by the identifier associated with that nonce in the routing table.

Other ways of routing messages in a network are of course also possible.

The root node will receive multiple such proximity computation request messages, one from each leaf node. Again, each message may need to have its signature verified or decrypted. The root node may also check whether the nonce in the request has been received before. If so, the request should be rejected, as it is likely to be a replay attack (or a network error).

Each message includes one proximity time value. The root node saves the received proximity time values, or alternatively saves only the largest received proximity time value. The root node checks if any received proximity time value exceeds the predetermined maximum allowed time. If this is the case, then the root node will not send any data to any of the nodes to which it is connected, or alternatively not to any node on a path whose proximity time value exceeds the maximum allowed time. The root node may send out an acknowledgement to nodes whose proximity time values is within the maximum allowed time.

Preferably the root node performs the proximity check at a predetermined time, for instance periodically every ten seconds.

Preferably a leaf node should cease receiving and/or rendering any content when it has not received an acknowledgement from the root node within a predetermined time. This makes it impossible for an attacker to simply block or filter proximity computation request messages in an attempt to hide the fact that one leaf node is very far away.

The value included in the request is typically recorded as a sequence of bits, e.g. as a 32-bits number. It may happen that the addition of link proximity values to the value recorded in the request results in a number that overflows the available number of bits. To indicate this event a special overflow indication flag may be provided in the request, which is turned on when an overflow occurs.

The overflow indication flag allows the root node to determine that an overflow occurred. If this is the case, it follows that the total round-trip time must exceed what can be recorded in the request. If the number of bits for this value is chosen large enough, then an overflow is an indication that the total round-trip time must be larger than the permitted maximum. Hence the root node should in this case save a record of the overflow and not send any data to any of the nodes to which it is connected.

At regular intervals during data transfer the proximity detection may be repeated to verify whether the devices are still in the required proximity of each other. For example, the proximity detection can be performed every minute or after every 1024 data packets received over the main link 211.

The determination of the distance of the devices in the network may also be initiated by the root node. The root node may then restrict or block transfer of the content if no responses are received within a predetermined amount of time.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of determining a proximity between a root node and a leaf node in a network, the method comprising the steps of:
    computing a link proximity value between any two mutually connected nodes in the network, the link proximity value being computed at predetermined time intervals;
    at an initial node, being one of the root node and the leaf node, sending a proximity computation request message containing a proximity counter and a random challenge number to an intermediate node to which said initial node is connected, the proximity computation request message being encrypted, and the random challenge number being included for purposes of authentication;
    at an intermediate node being connected to a first node and to a second node, upon receipt of the proximity computation request message containing a proximity counter from the first node, adding the computed link proximity value to the proximity counter and passing on the proximity computation request message to the second node; and
    at a final node, being the other of the root node and the leaf node, upon receipt of the proximity computation request message, determining the proximity between the root node and the leaf node as the value indicated by the proximity counter.

2. The method as claimed in claim 1, in which the initial node is the leaf node.

3. The method as claimed in claim 2, wherein the link proximity value between the leaf node and the intermediate node to which said initial node is connected is computed and stored by said intermediate node.

4. The method as claimed in claim 3, wherein the leaf node sends out the proximity computation request message in which the proximity counter is set to zero.

5. The method as claimed in claim 1, wherein the root node restricts or blocks a data communication if the proximity is determined to exceed a predetermined threshold.

6. The method as claimed in claim 5, wherein the proximity computation request message further contains an overflow flag, which is set to an 'off state by the initial node, in which the intermediate node sets the overflow flag to an 'on' state if the addition of the computed link proximity value to the proximity counter exceeds a predetermined maximum, and in which the root node restricts or blocks the data communication if the overflow flag is in the 'on' state.

7. A system comprising:
    a plurality of electronic devices interconnected via a network, each of said electronic devices corresponding to a node in the network, and each of the electronic devices being configured for determining a proximity between one of the plurality of electronic devices corresponding to a root node and another of the plurality of electronic devices corresponding to a leaf node in the network, any two mutually connected electronic devices in the network being configured for computing a link proximity value between them, the link proximity value being computed at predetermined time intervals;
    an initial electronic device of the plurality of electronic devices, corresponding to one of the root node and the leaf node, being configured for sending a proximity computation request message containing a proximity counter and a random challenge number, to an electronic device corresponding to an intermediate node to which said initial electronic device is connected, the proximity computation request message being encrypted, and the random challenge number being included for purposes of authentication;
    an electronic device corresponding to an intermediate node being connected to a first electronic device and to a second electronic device, being configured for, upon receipt of the proximity computation request message containing a proximity counter from the first electronic device, adding the computed link proximity value to the proximity counter and passing on the proximity computation request message to the second electronic device; and
    a final electronic device, being the other of the electronic device corresponding to the root node and the electronic device corresponding to the leaf node, being configured for upon receipt of the proximity computation request message, determining the proximity between the root node and the leaf node as the value indicated by the proximity counter.

8. An electronic device configured to operate as the initial node in the system as claimed in claim 7.

9. The electronic device as claimed in claim 8, wherein said electronic device is further configured to prevent reception and/or rendering of content if no response is received to the proximity computation request message within a predetermined amount of time.

* * * * *